July 28, 1936.  J. A. MacKENZIE  2,048,875
BRAKE TESTER
Filed Aug. 19, 1935
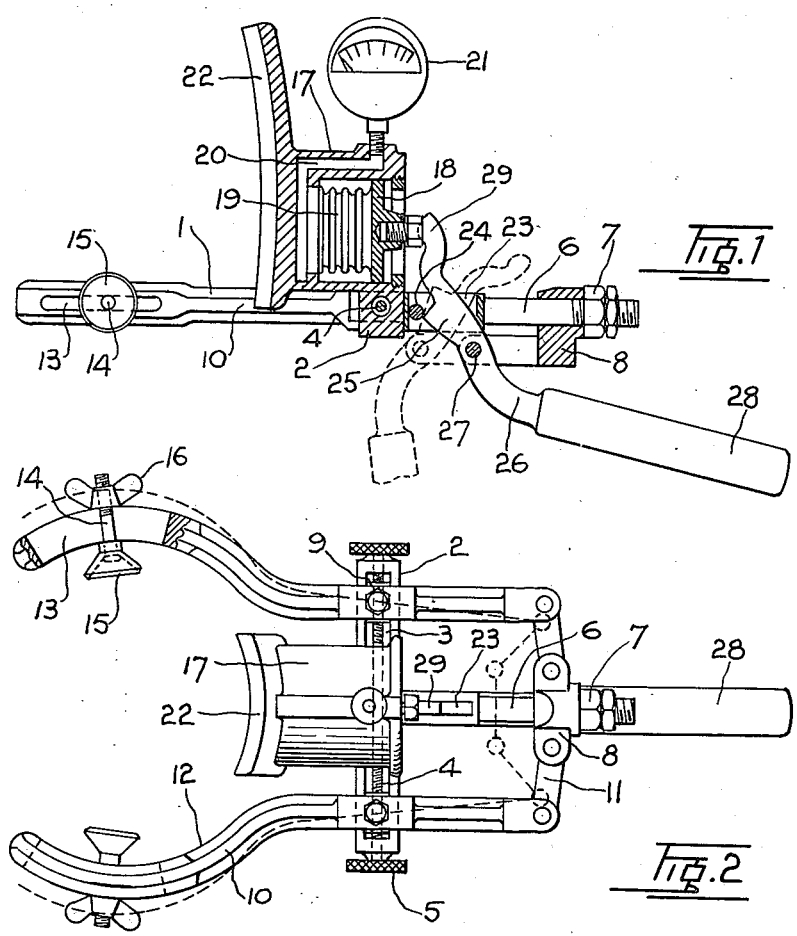
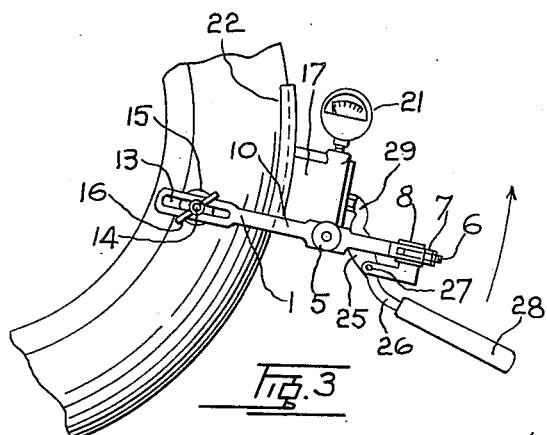
INVENTOR
JOHN ALEXANDER MACKENZIE
BY Featherstonhaugh & Co
ATTORNEYS Patented July 28, 1936

2,048,875

UNITED STATES PATENT OFFICE 2,048,875

BRAKE TESTER

John Alexander MacKenzie, Vancouver, British Columbia, Canada

Application August 19, 1935, Serial No. 36,889

3 Claims. (Cl. 265—1)

My invention relates to improvements in brake testers which are particularly adapted for use by garage and service station employees. The objects of the invention are to provide means capable of gripping the tire of a wheel, and of registering the force required to turn said wheel against the resistance to rotation provided by the vehicle brake. Further objects are to provide means whereby the gripping of the tire and the registering of applied force is effected with a single lever.

The invention consists of a clamp supporting a compression device, a gauge for registering the compression developed and a lever for operating the clamp and the compression device, as will be more fully described in the following specification, and shown in the accompanying drawing, in which:—

Fig. 1 is a sectional view of the invention.

Fig. 2 is a plan view showing the adjustment of the clamp.

Fig. 3 is a general view showing the brake tester applied to the tire of an automobile wheel.

In the drawing like characters of reference indicate corresponding parts in each figure.

The numeral 1 indicates a clamp consisting of a transverse member 2 having an elongated slot 3 in which a right and left hand screw 4 is rotatably mounted. The screw is provided at opposite ends with knurled nuts 5 by which the screw is turned.

Extending from the centre of the member 2 is a bar 6 having a stop nut 7 at its outer extremity and on this bar a forked arm 8 is slidably mounted.

A pair of crossheads 9 threadedly engage the screw 4 at opposite points and pivotally connected to these cross-heads are clamping arms 10, the rear end of which are pivotally connected by toggle links 11 to the forked arm 8. The forward ends of the clamping arms 10 are curved as at 12 to embrace the sides of a tire, and are each provided with a slot 13 in which the threaded shank 14 of a gripping element 15 is adjustably secured by a wing nut 16.

Mounted upon the transverse member 2 is a cylindrical casing 17 having a sliding plunger 18 which is adapted to bear upon the end of an oil filled bellows 19. The bellows communicate at one end through a ported passage 20 in the casing 17 with a pressure gauge 21.

Extending at substantially a right angle from the transverse member 2 is a plate 22 which is preferably concave and of a shape to conform substantially to the tread of a tire upon which it is adapted to bear.

The forward end of the bar 6 is slotted as at 23 and is fitted with a pin 24 which is adapted to be engaged by a cam 25 formed adjacent the free end of a hand lever 26. The lever 26 is fulcrumed at the free end of the forked arm 8 on a pin 27 and is provided at its outer end with a handle 28 and at its inner end with a finger 29, which is adapted to engage the plunger 18.

While I have shown an oil filled bellows in the cylindrical casing 17 and a plunger 18 slidable within the casing, it will be obvious that the casing may serve as an oil cylinder and the plunger 18 may serve as a plunger therein to bear upon the oil and register pressure upon the gauge in the same way as with the use of the bellows.

In use, the wheels of the car are jacked up and the brakes applied to a desired tension which is obviously maintained throughout the test, the clamp 1 is applied to a wheel by disposing the clamping arms 10 on opposite sides of the tire and placing the plate 22 in contact with its periphery. The gripping elements 15 are disposed at a suitable position and the screw 4 is adjusted to space the gripping elements apart, so that when the forked arm 8 is in its forward position as indicated in dotted line in Figure 2, the gripping arms can span the greatest diameter of the tire side walls. When the device is so positioned upon the tire the handle 28 is raised, causing the cam 25 to ride up onto the pin 24 and lock the clamp in fixed position upon the tire. When in this position the toggle links 11 are carried slightly beyond the centres of their pivotal connection with the rear end of the clamping arms and the forked arm 8 is in abutment with the stop nut 7, so that the clamp remains fixed and any further movement of the handle causes a pressure to be applied through the finger 29 to the plunger 18, thus giving a reading on the gauge 21. The pull on the handle is increased until the wheel starts to turn, when the gauge pressure is noted for comparison with the test of the remaining brakes. Similar tests are made on the brakes of each of the wheels and when a similar reading of the gauge is had from tests of each of the wheels with a given application of brake lever or pedal, the gripping power of each of the several brakes may be taken as identical.

By virtue of the right and left hand screw adjustment of the spacing of the clamping arms, the clamp may be adjusted to fit a variety of tire sizes and the range of action of the lever 26 to lock the clamp about the wheel remains unchanged.

What I claim as my invention is:

1. A brake tester comprising a clamp having a locking means, said clamp being adapted to engage the sides of a wheel adjacent its periphery, a registering device carried by the clamp and a lever for closing the clamp to grip the wheel and for operating the registering device, said lever serving to close and lock the clamp to grip the wheel on its initial movement and to operate the registering device on subsequent movement in the same direction.

2. A brake tester comprising a clamp adapted to engage the sides of a wheel adjacent its periphery, a registering device carried by the clamp and a lever for closing the clamp to grip the wheel and for operating the registering device, said clamp having spaced clamping arms adjustable to width of grip, and said lever having the same range of action to close the clamping arms upon the wheel irrespective of the spacing of said arms.

3. A brake tester comprising a clamp having a transverse member, a pair of clamping arms pivotally connected to the transverse member, means for spacing the pivotal points of said clamping arms intermediate the ends of the transverse member, a bar extending from the transverse member and a forked arm slidable therealong, a toggle link connecting the end of each clamping arm to the forked arm, a lever fulcrumed in the forked arm and having a cam adapted to thrust against the transverse member to rock the clamping arms and to lock them in closed position and a device carried by the transverse member adapted for operation by the lever when the clamping is in closed position to show the force ultimately applied to the lever.

JOHN ALEXANDER MacKENZIE.